F. E. WATTS.
AUTOMATIC TEMPERATURE CONTROL DEVICE FOR FLUID CIRCULATING SYSTEMS.
APPLICATION FILED FEB. 16, 1917.
1,287,534.
Patented Dec. 10, 1918.
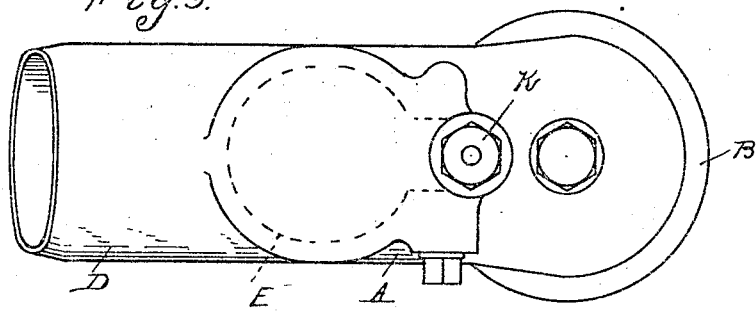
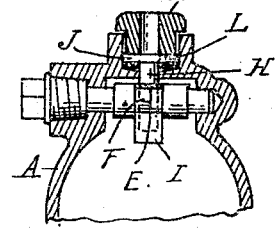
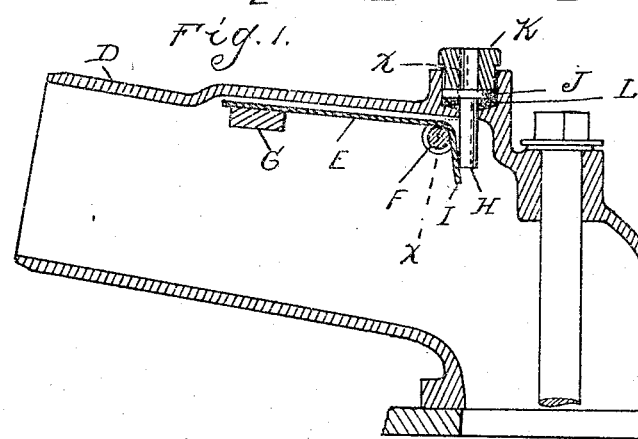
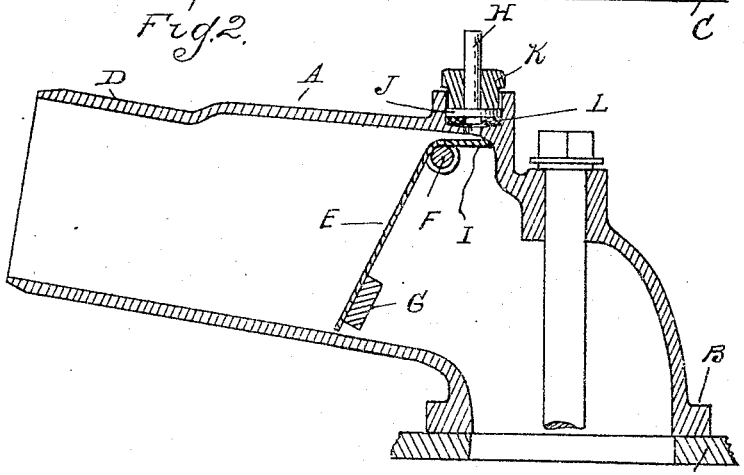
Inventor
Frank E. Watts
By Whittemore Hulbert Whittemore
Attorneys

UNITED STATES PATENT OFFICE.

FRANK E. WATTS, OF DETROIT, MICHIGAN, ASSIGNOR TO HUPP MOTOR CAR CORPORATION, OF RICHMOND, VIRGINIA, A CORPORATION OF VIRGINIA.

AUTOMATIC TEMPERATURE-CONTROL DEVICE FOR FLUID-CIRCULATING SYSTEMS.

1,287,534.  Specification of Letters Patent.  Patented Dec. 10, 1918.

Application filed February 16, 1917. Serial No. 149,128.

*To all whom it may concern:*

Be it known that I, FRANK E. WATTS, a citizen of the United States of America, residing at Detroit, in the county of Wayne and State of Michigan, have invented certain new and useful Improvements in Automatic Temperature-Control Devices for Fluid-Circulating Systems, of which the following is a specification, reference being had therein to the accompanying drawings.

The invention relates to fluid circulating cooling systems such as applied to internal combustion engines, and it is the object of the invention to provide automatic means for regulating the circulation in accordance with the temperature of the fluid, thereby maintaining a more uniform temperature in the engine. My improvement is applicable to various cooling systems but particularly to those of the thermo-siphon type.

In the drawings:

Figure 1 is a longitudinal section through a portion of the water outlet conduit between the engine and the radiator, showing my improved regulator applied thereto, but out of action;

Fig. 2 is a similar view showing the regulator in operative position;

Fig. 3 is a plan view of Fig. 1;

Fig. 4 is a cross-section on line *x—x* Fig. 1.

As illustrated my improved regulator is applied to the outlet conduit of the water circulating system for an engine, but it is obvious that it might be variously located without change in the principle of operation. In detail, A is the water outlet fitting having a flange union B with the water-jacket C of the engine, the free end of the fitting forming a nipple D for connection with the hose or flexible conduit (not shown). E is a valve arranged within the fitting A and hinged at its upper end by means of a pivot F. The valve is of such a shape as to obstruct or completely close the cross-section of the fitting when free to turn upon its pivot F, and a weight G or other force operates to normally hold the valve in closed position. There is, however, provision for retaining the valve in open position, which as shown comprises a pin H projecting into the fitting A and engaging a finger I projecting rearward from the hinge of the valve. This pin H, as shown, is provided with a head J which is clamped by a nut or plug K against a gasket L to form a water seal, and the plug is centrally apertured so as to permit of reversing the pin as shown in Fig. 2. In the latter position it is removed from the interior of the fitting and will therefore permit of free swinging of the valve.

With the construction as described when the parts are in the position of adjustment shown in Fig. 2 the valve E will normally rest in a position obstructing the fitting, so as to prevent circulation of the water. When the engine is first started and the water is cold, circulation will be prevented so that the heat will rapidly rise. When, however, the temperature of the water in the cylinder is sufficiently high the increased pressure on the underside of the valve, due to the difference in gravity of the hot and cold water columns, will cause the opening of the valve against the force of the weight G. The higher the temperature of the outgoing water the greater will be the differential pressure and consequently opening of the valve is substantially proportional to the temperature.

The device is designed primarily for use in cold weather where the cooling capacity of the radiator is in excess of the need. When, however, the external temperature is higher it may be desirable to cut out the operation of the valve, which is quickly accomplished by loosening the plug K, reversing the pin H and re-inserting the plug. This will hold the valve in the position shown in Fig. 1, where it is removed from the cross-section of the fitting to provide an unobstructed flow for the water.

It is obvious that various constructions may be used to perform the office of the plug K. One of the simplest of these would be a lever controlled from the driver's seat.

What I claim as my invention is:—

1. The combination with a conduit fitting, of a valve hinged at its upper end within said fitting and normally held by gravity in a position to obstruct the flow, said valve being adjustable to a non-obstructing position, and means for locking said valve in its non-obstructing position, comprising a finger projecting from the hinge of the valve and a pin insertible through the top of the fitting to form a stop for said finger.

2. The combination with a conduit fitting, of a valve hinged therein and normally held by gravity in a position to obstruct the flow, said valve being adjustable into a non-obstructing position, and means for locking and unlocking said valve in its non-obstructing position, comprising a headed pin insertible through an aperture in the fitting forming a stop for the valve and being reversible to unlock said valve and a plug for clamping the head of said pin to hold the same in position, said plug being apertured to receive the stem of the pin when the same is reversed.

3. The combination with a conduit fitting, of a valve hinged therein and movable from an obstructing to a non-obstructing position, and a member inserted in the wall of said fitting and reversely engageable therewith, functioning in one position to maintain said valve in its non-obstructing position and having no effect on the valve in its reverse position.

4. The combination with a conduit fitting, of a valve hingedly mounted within said fitting, a headed pin having its stem insertible through an aperture in said fitting to engage the valve and maintain the same open, and means exteriorly engageable with said fitting to retain said pin with its stem extending either inwardly or outwardly.

In testimony whereof I affix my signature.

FRANK E. WATTS.

Copies of this patent may be obtained for five cents each, by addressing the "Commissioner of Patents, Washington, D. C."